April 30, 1929.　　　C. A. ROWLEY　　　1,710,898
CUTTING AND MEASURING APPARATUS FOR SHEET GLASS
Filed May 19, 1924　　　5 Sheets-Sheet 1
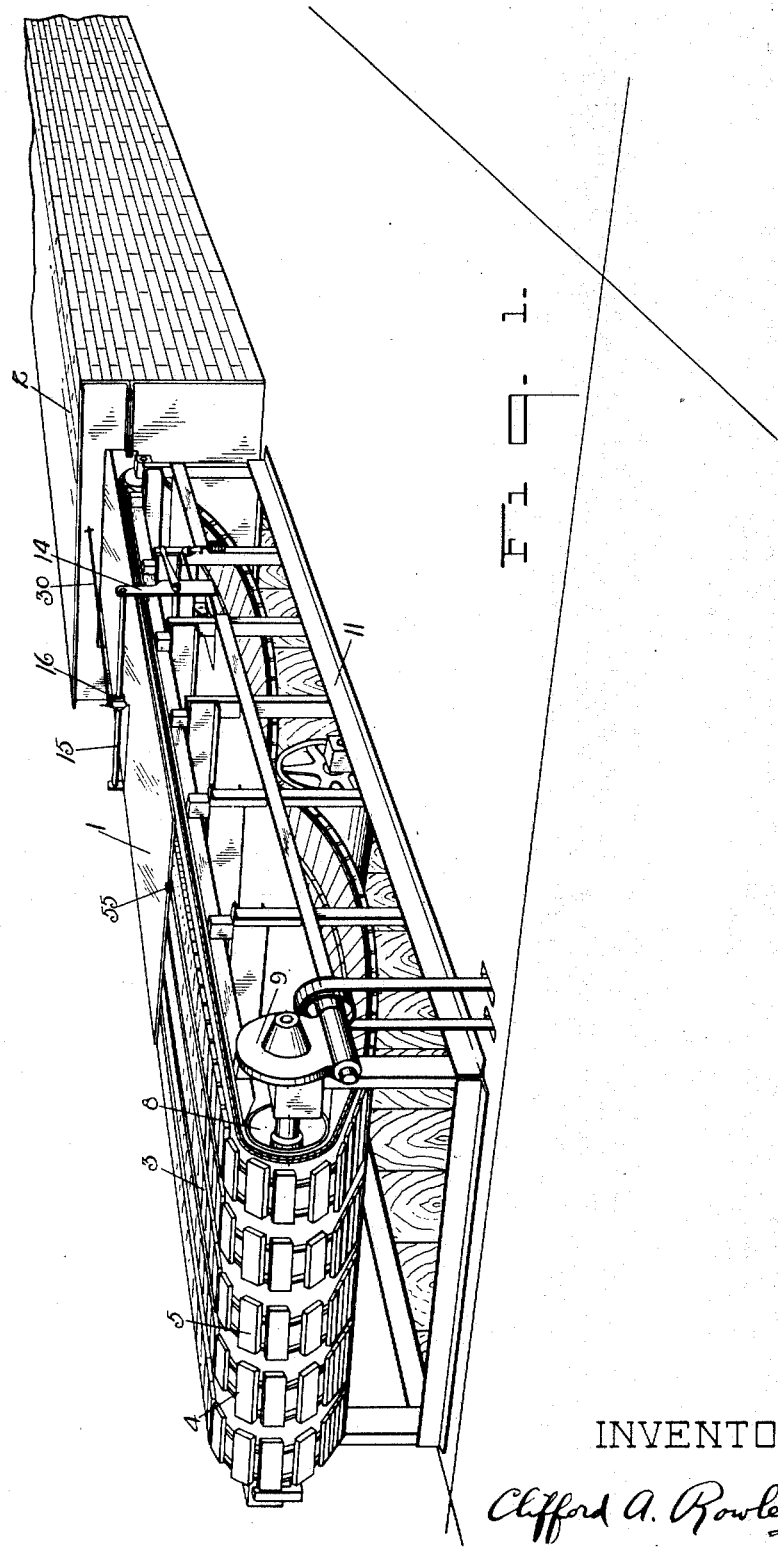
INVENTOR.
Clifford A. Rowley

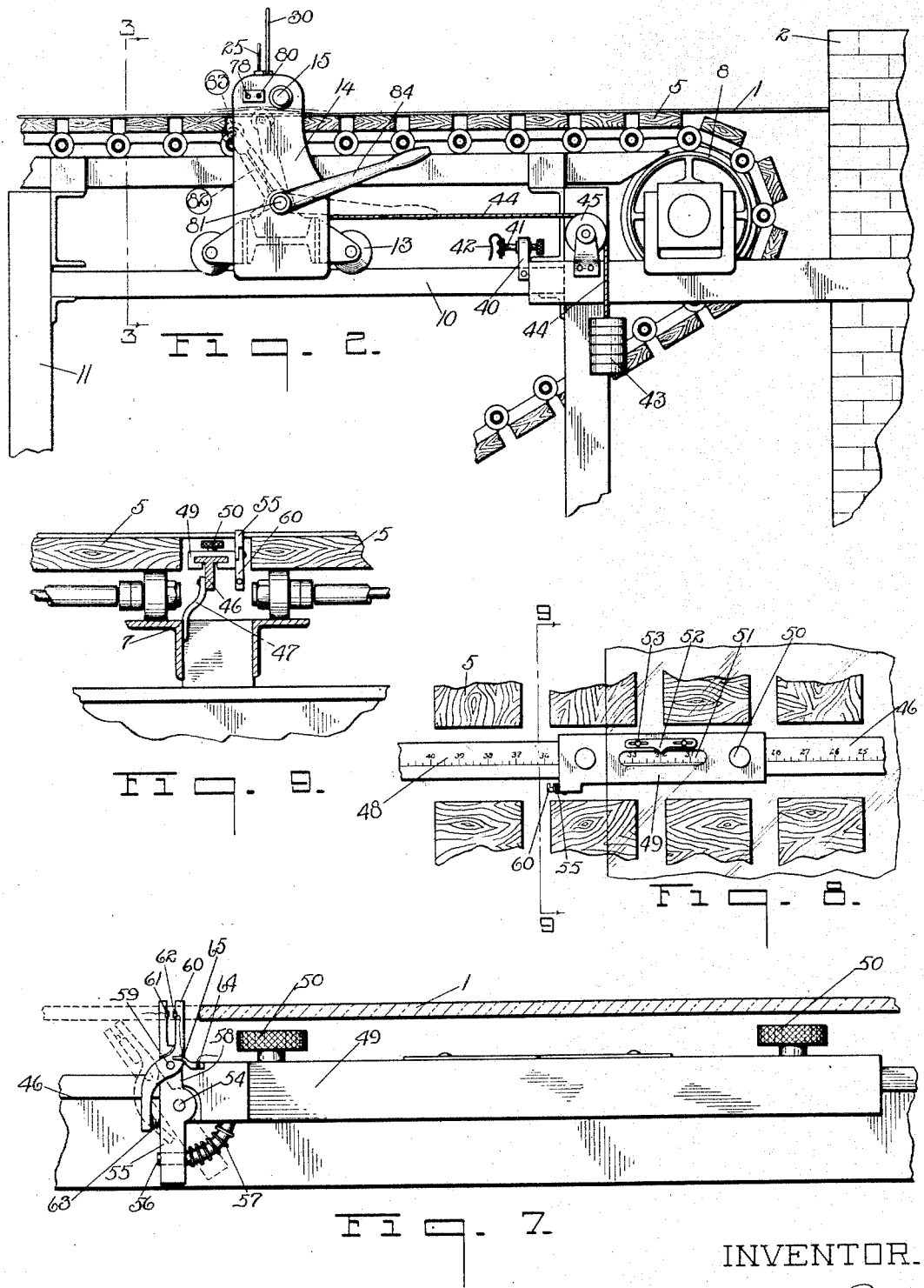

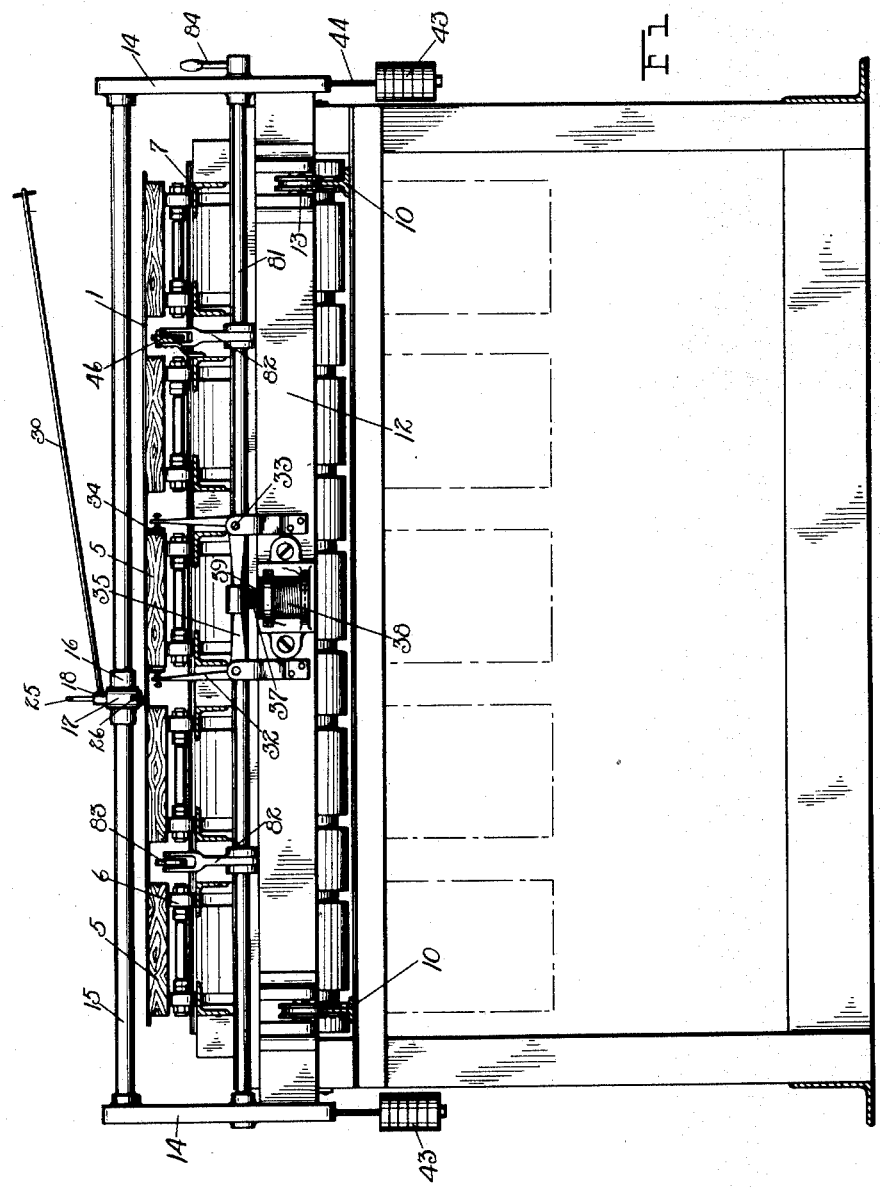

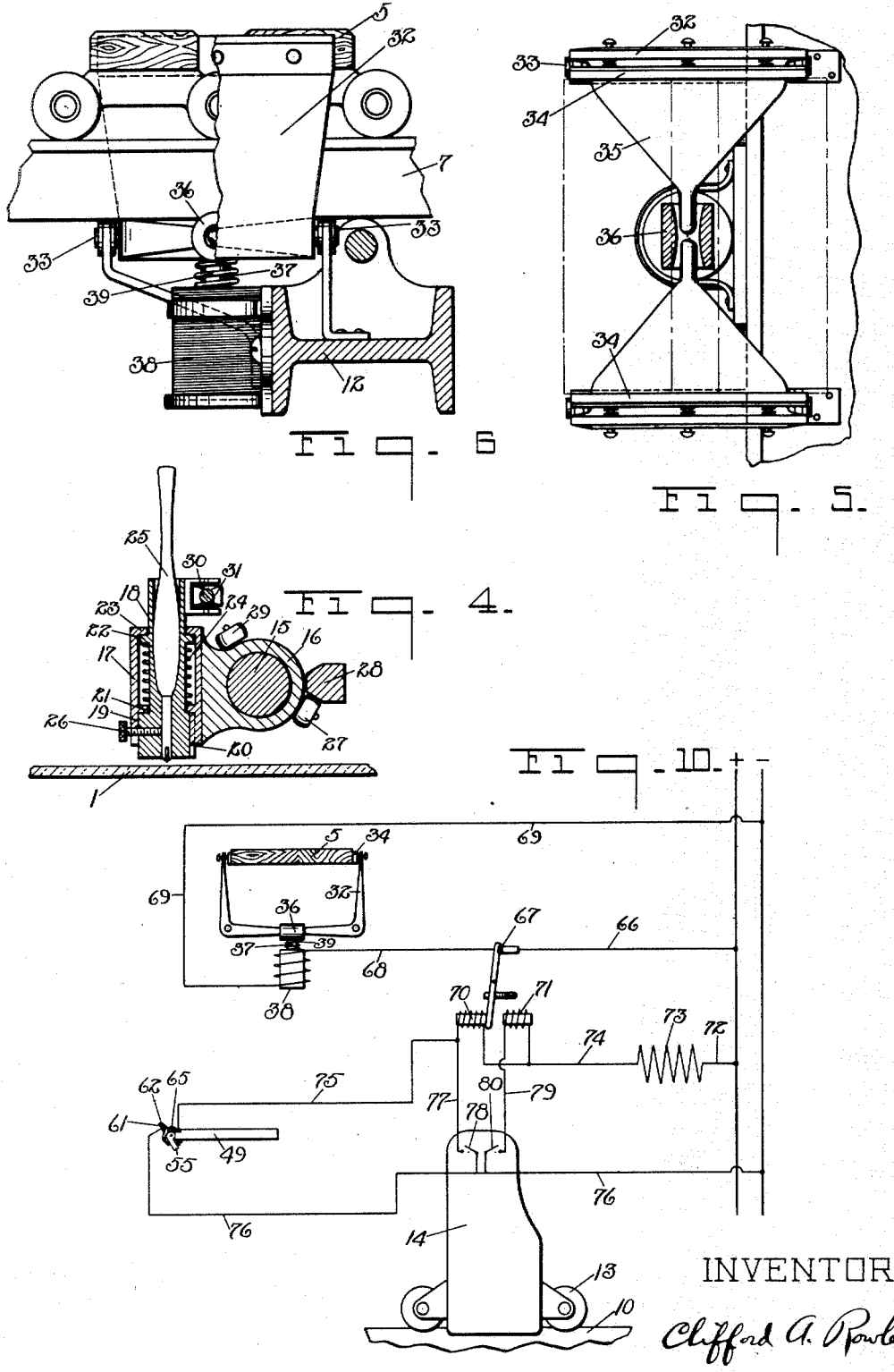

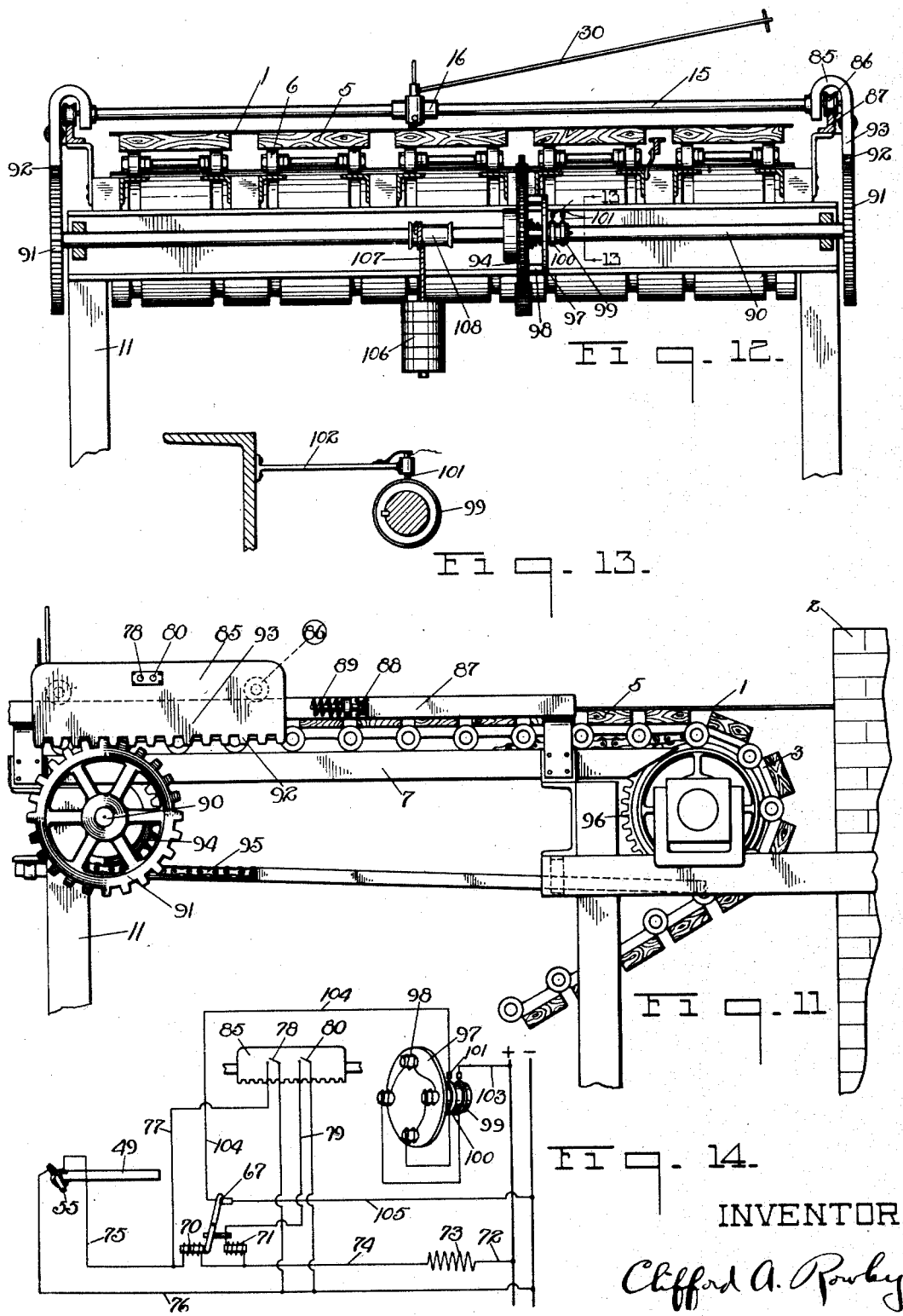

Patented Apr. 30, 1929.

1,710,898

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

CUTTING AND MEASURING APPARATUS FOR SHEET GLASS.

Application filed May 19, 1924. Serial No. 714,417.

This invention relates to an apparatus for cutting or scoring transversely, at intervals, a continuously drawn sheet of glass.

In certain systems of producing sheet glass, a continuous flat sheet of glass is drawn from a molten source, and passed through a horizontal leer. The continuous sheet of glass emerges from the leer onto a moving table or conveyor, known as the "cutting table", and while on this table, sections are carried away to the cutting room where they are divided into the desired sizes. This cutting of sheets or sections from the continuously advancing ribbon of glass is usually performed with a hand operated cutting tool which is drawn across the sheet at intervals. These score lines are seldom accurately straight or perpendicular to the line of travel of the sheet. The distance between score lines is also only roughly measured, so that there is considerable waste at the ends where the sheets are afterwards accurately cut down to the desired sheet sizes.

The object of the present invention is to provide an apparatus for accurately scoring the sheet along straight transverse lines perpendicular to the travel of the sheet. Means are also provided to measure the length of the sheet sections accurately, that is measure accurately the distance of the score line from the advancing end of the ribbon where the last preceding cut was made. In this way the sheet sections will be cut with accurate parallel end edges, a fixed distance apart, so that there will be no necessary waste at these ends of the sheet sections during the subsequent cutting process.

Other objects and advantages of the invention will become apparent from the following detailed description of certain approved forms of the apparatus.

In the accompanying drawings:

Fig. 1 is a perspective showing the end of the leer, and the cutting table with the scoring apparatus forming the subject-matter of the present invention installed thereon.

Fig. 2 is an end view of the cutter carriage, and adjacent portions of the cutting table, on an enlarged scale.

Fig. 3 is a vertical transverse section taken substantially on the line 3—3 of Fig. 2.

Fig. 4 is a vertical section on an enlarged scale through the carrier for the scoring tool.

Fig. 5 is a plan view of the clamping mechanism for connecting the carriage with a portion of the conveyor.

Fig. 6 is a side elevation of this clamping mechanism, parts being broken away.

Fig. 7 is an enlarged side elevation of the sheet-measuring member.

Fig. 8 is a plan view of the measuring member on a smaller scale.

Fig. 9 is a transverse vertical section taken substantially on the line 9—9 of Fig. 8.

Fig. 10 is a wiring diagram for this form of the apparatus.

Fig. 11 is a side elevation, similar to Fig. 2, of a modified form of the apparatus.

Fig. 12 is a transverse vertical section. This view is taken looking from the left at Fig. 11.

Fig. 13 is a detail of one of the brush holders.

Fig. 14 is a wiring diagram for this modification.

Referring first to the form of the apparatus shown in Figs. 1 to 10 inclusive, the flat continuous sheet of glass 1 emerges from the end of leer 2, onto the moving supporting table or conveyor 3 which moves at the same speed as the sheet of glass. This table 3 may take a variety of forms, but is here shown as comprising a series of parallel endless chains 4, carrying a series of wood blocks 5, which form in the upper run of the chains a flat even supporting table for the glass sheet. Each chain has a series of rollers 6, which, in their upper run, travel on the supporting tracks 7. The chains are carried at their ends on rollers or sprockets 8, one of which is driven by any suitable means as shown at 9, Fig. 1, to move the table in the same direction and at the same speed as the sheet 1.

It has been customary in former practice, to divide the endless sheet or ribbon 1 into sections of the desired size, by manually drawing a scoring tool, at intervals, across the moving sheet. Since the sheet is in motion, it is particularly difficult to make an accurate straight cut exactly at right angles to the line of travel of the sheet. It is also difficult to accurately measure off the desired length of sheet between the successive score lines. After the sheet is scored it is broken along the scored line by inserting the hand or a tool beneath the edge of the sheet, and elevating the sheet until it cracks along the scored line.

The present invention is designed to more accurately and simply perform the above operations, thus saving both labor and glass. Mounted at each side of and beneath the conveyor table are short rails 10 mounted at their ends on the supporting structure 11 for the cutting table. The rails 10 at either side of the table extend parallel to each other and to the direction of travel of the sheet and cutting table. They need not be very long as the total travel of the cutter-carriage which moves thereon will be only a few inches. A carriage 12 extending transversely beneath the cutting table and glass sheet has rollers 13 which are supported on and guided by the rails 10. At either end of the table a wall 14 extends upwardly above the cutting table 3 and glass sheet 1, and these walls 14 are joined by a transverse guide bar 15. This bar 15, in any position of the carriage 12, extends above the glass sheet 1 accurately at right angles to the direction of travel of the sheet.

The cutting or scoring tool is adapted to be guided back and forth along the bar 15. This scoring tool and the means for carrying same may be made in a variety of forms, one approved example being shown more particularly in Figs. 3 and 4. As here shown, the guide rail 15 is circular in cross-section, and the tool carriage 16 has a slidable and rotatable fit on this guide bar. The carriage 16 at one side is provided with a cylindrical housing 17 for the tool holder 18. This tool holder is adapted to have a limited vertical sliding movement through the housing 17, the lower portion of the holder snugly fitting a cylindrical recess 19 in the lower portion of the housing and being keyed thereto at 20 to prevent relative rotation of the two members. Upward movement of holder 18 through the housing is limited by the engagement of the lower portion of holder 18 with an inwardly extending flange 21 of housing 17, and by the engagement of the outwardly extending flange 22 on the holder with the inwardly extending flange 23 at the upper end of the housing. A compression spring 24 confined between the flanges 21 and 22 serves to normally hold the tool holder, and the tool, at the upper limit of their movement. The cutting tool 25 is here shown as of the ordinary steel-wheel type (although a diamond might be used), and this tool is removably secured in the holder by set-screw 26. Although the tool carriage 16 is rotatable about the guide bar 15, its rotation in one direction is limited by the engagement of roller 27 pivoted on the housing 16 with a stationary guide bar 28 positioned parallel to guide bar 15 as shown in Fig. 4. The relative locations of roller 27, guide bar 28, and housing 17, are such that when the roller 27 is in engagement with bar 28, scoring tool 25 will extend perpendicular to the surface of glass sheet 1, therebeneath. A second guide roller 29 is carried by carriage 16 at such a position that the carriage may be swung around clockwise, as viewed in Fig. 4, until this roller engages with the upper side of guide bar 28. In this position the carrier and cutting tool will be supported entirely away from the sheet 1 to allow greater freedom of movement in handling the glass sheet. Handle 30, of sufficient length to be easily grasped by the operator standing at the right of the machine as viewed in Figs. 1 and 3, is secured through universal joint 31 to one side of the upper end of tool holder 18.

When operating the scoring tool, the operator grasps the outer end of rod 30 and pushes the carriage 16 backward and forward along the guide bar 15. Whenever it is desired to make a score line on the glass sheet a downward pressure is exerted on the handle 30 which will lower the tool against the action of spring 24 onto the surface of the glass sheet. Whenever this downward pressure on the handle 30 is removed the spring 24 will elevate the cutting wheel away from the sheet surface. When not in use it is preferable to throw the carriage and cutting tool over to the right, Fig. 4, until the roller 29 engages with the upper side of guide bar 28. When in this position there is no possibility of the glass sheet coming into contact with the cutting wheel, even though the sheet might be elevated somewhat above the surface of the conveying table.

The above described mechanism is merely one example of a scoring device that could be mounted on the guide bar 15. If desired a simple flat bar in the form of a straight-edge could be substituted for this guide bar 15, and an ordinary hand-operating scoring tool drawn along this edge to perform the cutting operation.

It is obvious that since the glass sheet 1 and table 3 are continually moving it is necessary that the carriage 12 and cutter guide 15 move with the table and sheet while the scoring operation is being performed. The present invention embodies means whereby the carriage is clamped to the conveyor or cutting table during the scoring operation, and since this conveyor and the glass sheet move at substantially the same speed, the guide bar 15 will move with the sheet and the score line will be exactly at right angles to the direction of travel of the sheet.

Referring now to Figs. 3, 5 and 6, a pair of bell-crank levers 32 are pivoted as at 33 on carriage 12, and on the upper arms of these levers are yieldably mounted clamping plates 34 which, when the upper arms of the bell-cranks are swung toward one another, are adapted to engage the ends of one or more of the sheet supporting blocks 5, of one section of the conveyor table. The lower arms 35 of the bell-cranks are engaged by the upper end 36 of the core 37 of a solenoid 38, also mounted on carriage 12. When solenoid 38 is energized (as hereinafter described), the arms 35 of the bell-cranks will be drawn downwardly and the clamping plates 34 brought into gripping engagement with ends of certain of the blocks 5 of the table. This will cause the carriage 12 and all of the mechanism carried thereby to move along rails 10 with the conveyor 3 and glass sheet 1 until the clamping plates 34 are released by deenergizing solenoid 38. At such time spring 39 acts to positively withdraw the clamping plates from engaging position.

Mounted in suitable brackets 40, see Fig. 2, secured to the rails 10, are stop-screws 41. A buffer spring 42 at the end of screw 41 is adapted to engage with a portion of the carriage 12. Weights 43 are suspended from one end of cables 44 which pass up over guide pulleys 45, the other ends of the cables being fastened to portions of carriage 12. When the carriage is released from the conveyor table by deenergizing solenoid 38, the weights 43 will draw the carriage back to its normal stationary position against the stops 42.

Referring now more particularly to Figs. 7, 8 and 9, a stationary rail or measuring bar 46 is supported beneath the path of travel of glass sheet 1 in one of the spaces between adjacent rows of supporting blocks 5. This bar 46 may be in the form of an angle iron, as shown in Fig. 9, and may be carried by brackets 47 projecting upwardly from one of the track rails 7 heretofore described. On the upper surface of bar 46 is suitably marked or engraved a scale 48, which indicates in inches and fractions thereof the distance from the position of the scoring device on carriage 12 when in operative position. Slidably mounted on the upper flanged portion of bar 46 is a switch supporting member or carriage 49, which may be secured in fixed position at any point along the bar 46 by means of set-screws 50. A portion of the upper surface of member 49 is cut away at 51 so that the scale 48 is visible therethrough, and a pointer 52 is adjustably secured as at 53 to the upper surface of member 49 adjacent the slot or opening 51. Pointer 52 is adapted to indicate on scale 48 the length of sheet which the scoring device is set to cut.

At the forward end of member 49, a contact carrying lever 55 is pivoted at 54. An arcuate guide rod 56 extends from the lower side of member 49 through an opening in the lower end of lever 55 and a compression spring 57 surrounding guide 56 normally holds lever 55 in the normal vertical position against stop 58, illustrated in Fig. 7. Pivoted on contact carrying lever 55 at 59 is a second contact carrying lever 60. The two electrical contacts 61 and 62 carried by the levers 55 and 60 respectively, are normally held out of contact with one another by the compression spring 63 mounted between the lower end of lever 60 and a portion of lever 55. A stationary contact 64 mounted on the supporting member 49 is adapted to normally engage with a second contact 65 mounted on a portion of the upper arm of lever 60, as shown in Fig. 7.

The contacts 61, 62 and 64, 65 are connected in series in a controlling circuit hereinafter described. When the advancing free end of glass sheet 1 reaches a position over the control mechanism just described, the sheet will first move the upper end of lever 60, against the resistance of spring 63, (which is considerably weaker than spring 57), until the contacts 61 and 62 engage with one another. At this time the circuit will be completed, and the carriage clamping mechanism actuated, as hereinafter described. Further movement of sheet 1 will swing the pair of levers 60 and 61 about pivot 54 against the resistance of spring 57 to the dotted line position shown in Fig. 7, and the sheet 1 may travel steadily on its way. When the pair of levers is first swung away from the spring contact 65 the operating circuit will be broken at this point. This is merely for the purpose of saving electrical energy. When the severed section of sheet 1 is removed from above the switch mechanism, spring 57 will swing the levers back to their normal vertical position, and spring 63 will separate the contacts 61 and 62. The circuit is now again completed at 64 and 65 but broken at 61 and 62, and the parts are in position for a new operation when the new advancing end of sheet 1 reaches this switch mechanism.

Referring now to the wiring diagram shown in Fig. 10, a main solenoid operating circuit extends from the positive main through wire 66, main operating switch 67, wire 68 to solenoid 38, thence through wire 69 to the negative main. The main operating switch 67, which is mounted at some convenient point on carriage 12 is of the type adapted to be thrown in or out of circuit closing position by a pair of operating solenoids 70 and 71. A control circuit for closing main switch 67 extends from the positive main through wire 72, resistance 73, wire 74, solenoid 70, wire 75, contacts 64, 65, 61 and 62, heretofore described, and wire 76 to the negative main. A second shunt circuit is formed from wire 75 through wire 77 and push button switch 78 to the wire 76. It will be seen that whenever the contacts 61 and 62 are brought together, or push button 78 is closed, solenoid 70 will be energized and main switch 67 will be thrown to closed position. The main circuit will now be completed through solenoid 38 and the clamping members 34 will be brought into engagement with certain of the blocks 5 of the conveyor table. Although the control circuit is almost immediately broken by the separation of contacts 64 and 65, or by releasing the push button 78, the main switch 67 will remain closed and solenoid 38 will remain energized to hold the clamp in operative position. The carriage 12 will continue to move with the conveyor and glass sheet until the main circuit is broken at switch 67. This is accomplished by energizing the releasing solenoid 71. There is a circuit from the positive main through wire 72, resistance 73, wire 74, solenoid 71, wire 79, release push button 80, and wire 76 to the negative main. Whenever push button 80 is momentarily closed, the main switch 67 will be opened and the solenoid 38 deenergized. At this time the carriage will be released from the conveyor and will be returned to its normal stationary position by the weights 43.

Mounted on a cross-shaft 81 extending transversely through carriage 12 beneath the sheet 1 and conveyor 3, is a series of upwardly extending crank arms 82, each carrying at its upper end a roller 83. An operating handle 84 is secured to the outer end of shaft 81 in position to be readily grasped by the operator. After the score has been made across the glass sheet, the operator will grasp the handle 84 and depress same, thus simultaneously lifting all of the rollers 83 against the lower surface of the sheet between the several rows of blocks 5 and elevating the sheet adjacent the scored line until it breaks along this line.

In operation, the attendant will first move the member 49 along the measuring bar 48 until pointer 52 is opposite the number indicating the length of sheet which he desires to cut. The member 49 is then fixed in position by tightening screws 50 and needs no further attention so long as sheets of this length are to be cut. When the advancing free end of the glass sheet encounters the upwardly extending ends of the switch levers, the circuits heretofore described will be closed and the carriage 12 will be clamped to the conveyor 3 and commence to move therewith. As soon as the operator observes that the carriage is moving with the sheet he will draw the scoring tool across the sheet as heretofore described. He then depresses handle 84 and breaks off the sheet along the scored line. He will then touch the push button 80 which releases the clamping mechanism and the carriage 12 automatically returns to its normal stationary position against stops 42. When the severed section of sheet 1 has been removed the control switches will automatically assume their normal position ready for the next operation as heretofore described. Whenever it is desired to change the length of sheet being cut it is only necessary to release the set-screws 50 and shift member 49 along the measuring bar 46 until the desired length of sheet is indicated on scale 48 opposite pointer 52. If for any reason the operator desires to cut a shorter length of sheet at any time, he need merely press upon the push button 78 which will lock the carriage 12 to the conveyor, and the scoring operation may then be performed.

The accuracy of the measuring device may be adjusted at any time by moving the stop-screws 41 or by resetting the pointer 52 on member 49 by means of adjusting screws 53.

In Figs. 11, 12, 13 and 14, is illustrated a modified form of the apparatus in which the longitudinally moving parts of the mechanism are all mounted above the conveyor and glass sheet. In this form the carriage 85 for guide bar 15 has rollers 86 which travel on rails 87 mounted at the sides of the machine above or level with the glass sheet 1. Stop-screws 88 and buffer springs 89 limit the return position of carriage 85. A rotary shaft 90 is mounted in suitable bearings in the fixed frame-work 11 beneath the upper run of the conveyor. Fixed to each end of shaft 90 is a gear 91 meshing with a rack 92 formed on the downwardly extending side plate 93 of carriage 85. A sprocket 94 is adapted to normally rotate freely on shaft 90, and a sprocket chain 95 connects sprocket 94 with a sprocket 96 secured to turn with the supporting and driving drum for the adjacent end of conveyor 3. The sprockets 94 and 96, and the gears 91, are so proportioned that when sprocket 94 is clutched to shaft 90, as hereinafter described, the carriage 85 will be caused to move along rails 87 at the same speed as the glass sheet 1 and in the same direction.

Secured to shaft 90 adjacent one side of sprocket 94 is a disc or plate 97 carrying a series of magnets 98. The energizing circuit for these magnets is completed through a pair of slip rings 99 and 100 mounted on shaft 90, upon which bear the brushes 101 carried by fixed brush-holders 102.

Now referring to the wiring diagram shown in Fig. 14, it will be noted that a main operating circuit extends from the positive main through wire 103, slip ring 99, magnets 98, slip ring 100, wire 104, main switch 67 and wire 105 to the negative main. The control circuits for the automatic switches 61 and 62 and the manuallly operated push buttons 78 and 80 are identical with those already described in connection with Fig. 10.

The automatic measuring switches carried by member 49 will be adjusted in exactly the same manner as described in connection with the first modification. When the control circuit is completed by the free end of glass sheet 1 closing the contacts 61, 62, the magnets 98 will be energized and sprocket 94 will be magnetically clutched thereto and hence to shaft 90. Since this sprocket 94 is being constantly rotated by sprocket 96 and chain 95, the shaft 90 and gears 91 will now be rotated and will move the carriage 85 along rails 87 at the same speed as the glass sheet. After the scoring operation has been performed in the manner heretofore described, the operator will press the release button 80, which will deenergize magnets 98. A weight 106 is suspended from the lower end of cable 107 which is coiled about a drum 108 on shaft 90. When the magnets 98 are deenergized this weight 106 will descend and rotate shaft 90 and gears 91 in a reverse direction to return the carriage 85 to its normal stationary position against the stops 38. As with the modification first described, the carriage may be caused to move with the table for cutting the sheet at any time regardless of the measuring device, by simply pressing the push button 78 which will cause the magnets 98 of the magnetic clutch to be energized.

Claims:

1. In cutting apparatus for a moving sheet of glass, a cutter arranged above said sheet, a supporting member mounted adjacent the path of travel of the sheet, a pair of electric-contact-carrying levers pivotally mounted on the member and extending into the path of travel of said sheet, contacts on the levers movable into engagement with one another by the advancing free end of said sheet to cause said cutter to be moved along with said sheet, yielding means for normally holding the contacts separated, and yielding means for normally holding the levers in the path of travel of the glass sheet.

2. In cutting apparatus for a moving sheet of glass, a cutter arranged above said sheet, a supporting member mounted adjacent the path of travel of the sheet, an electric-contact-carrying lever pivoted on the member, a second contact-carrying lever pivoted on the first lever, contacts on the levers movable into engagement with one another by the advancing free end of said sheet to cause said cutter to be moved along with said sheet, yielding means for normally holding the contacts separated, and yielding means for normally holding the levers in the path of travel of the glass sheet.

3. An apparatus for transversely scoring a moving sheet of glass, comprising a movable conveyor, a carriage movable adjacent and parallel with the movement of the conveyor and sheet and including a guide for a scoring tool extending transversely of the sheet, electrically controlled means for clamping the carriage to said conveyor, and a control switch actuated by engagement with the advancing free end of the glass sheet for actuating said clamping means.

4. An apparatus for transversely scoring a moving sheet of glass, comprising a movable conveyor, a carriage movable adjacent and parallel with the movement of the conveyor and sheet and including a guide for a scoring tool extending transversely of the sheet, electrically controlled means for clamping the carriage to said conveyor, and a contact device engageable by said sheet for actuating said clamping means upon movement thereof in one direction.

5. In combination with a conveyor for carrying a moving sheet of glass, stationary guides positioned parallel to the direction of movement of the conveyor and glass sheet on either side thereof, a carriage supported by and movable along the guides and including a guide for a scoring tool extending transversely across the glass sheet, electrically operated means on the carriage for gripping a portion of the conveyor, and electric control means for the gripping means actuated by engagement with the advancing free end of the glass sheet.

6. In combination with a conveyor for carrying a moving sheet of glass, stationary guides positioned parallel to the direction of movement of the conveyor and glass sheet on either side thereof, a carriage supported by and movable along the guides and including a guide for a scoring tool extending transversely across the glass sheet, electrically operated means on the carriage for gripping a portion of the conveyor, a pivotally mounted electric-contact-carrying lever arranged in the path of travel of said sheet, a second contact-carrying lever pivoted on the first lever, and contacts on the levers movable into engagement with one another by the advancing free end of the glass sheet for actuating the said gripping means.

7. In combination with a conveyor for carrying a moving sheet of glass, stationary guides positioned parallel to the direction of movement of the conveyor and glass sheet on either side thereof, a carriage supported by and movable along the guides and including a guide for a scoring tool extending transversely across the glass sheet, electrically operated means on the carriage for gripping a portion of the conveyor, a pair of pivotally mounted electric-contact-carrying levers arranged in the path of travel of said sheet, and contacts on the levers movable into engagement with one another by the advancing free end of the glass sheet for actuating the said gripping means.

Signed at Toledo, in the county of Lucas, and State of Ohio, this 16th day of May, 1924.

CLIFFORD A. ROWLEY.